US008644798B2

(12) United States Patent
Doyle et al.

(10) Patent No.: US 8,644,798 B2
(45) Date of Patent: Feb. 4, 2014

(54) METHOD AND APPARATUS FOR SEPARABLE VOICE BILLING FOR BUSINESS AND PERSONAL AIRTIME USE

(75) Inventors: Thomas F. Doyle, San Diego, CA (US); Craig Lauer, San Diego, CA (US); Susan Hennefent, San Diego, CA (US); Thomas Thibault, San Diego, CA (US)

(73) Assignee: Omnitracs, Inc., San Diego, CA (US)

( * ) Notice: Subject to any disclaimer, the term of this patent is extended or adjusted under 35 U.S.C. 154(b) by 1693 days.

(21) Appl. No.: 11/777,026

(22) Filed: Jul. 12, 2007

(65) Prior Publication Data

US 2009/0017788 A1    Jan. 15, 2009

(51) Int. Cl.
*H04M 11/00*    (2006.01)

(52) U.S. Cl.
USPC ........... 455/406; 455/407; 455/408; 455/410; 455/411; 455/405; 455/414.1; 455/415

(58) Field of Classification Search
USPC ......... 455/405, 406, 408, 403, 415, 410, 411, 455/414.1; 379/210.02, 207.15, 142.01
See application file for complete search history.

(56) References Cited

U.S. PATENT DOCUMENTS

| | | | |
|---|---|---|---|
| 6,085,080 A * | 7/2000 | Rahikainen et al. | 455/403 |
| 6,253,075 B1 * | 6/2001 | Beghtol et al. | 455/415 |
| 6,370,235 B1 * | 4/2002 | Heiner | 379/67.1 |
| 6,473,615 B1 * | 10/2002 | Theppasandra et al. | 455/445 |
| 6,771,982 B1 * | 8/2004 | Toupin | 455/557 |
| 7,333,796 B2 | 2/2008 | Scalisi et al. | |
| 2002/0022472 A1 * | 2/2002 | Watler et al. | 455/405 |
| 2002/0042715 A1 * | 4/2002 | Kelley | 705/1 |
| 2003/0112936 A1 * | 6/2003 | Brown et al. | 379/121.02 |
| 2004/0097220 A1 * | 5/2004 | McGregor et al. | 455/419 |
| 2006/0019630 A1 * | 1/2006 | Sposato et al. | 455/406 |

FOREIGN PATENT DOCUMENTS

| | | |
|---|---|---|
| EP | 1531698 | 5/2005 |
| JP | 10155041 A | 6/1998 |
| JP | 10322479 A | 12/1998 |
| JP | 2004350226 A | 12/2004 |
| JP | 2006050266 A | 2/2006 |
| WO | 0201846 | 1/2002 |
| WO | 0208863 | 1/2002 |

OTHER PUBLICATIONS

International Search Report—PCT/US08/069745, International Search Authority—European Patent Office—Apr. 22, 2009.
Written Opinion—PCT/US08/069745, International Search Authority—European Patent Office—Apr. 22, 2009.

* cited by examiner

*Primary Examiner* — Khalid Shaheed
(74) *Attorney, Agent, or Firm* — Arent Fox LLP (57) ABSTRACT

Separable billing of business and non-business calls to/from a remote station or wireless communications device is provided. Business calls may be billed to the business, or other entity that provides a telephone to a user, and non-business calls may be billed to a user personally. When a call is desired to be connected, it is determined if the number of the call is a business number. If the number is a business number, the call is placed and billed to the business. If the number is not a business number, the call is placed and billed to the user when the user approves personal billing for the call. If the user does not approve personal billing of a non-business call, the call may be denied.

20 Claims, 8 Drawing Sheets

METHOD AND APPARATUS FOR SEPARABLE VOICE BILLING FOR BUSINESS AND PERSONAL AIRTIME USE

BACKGROUND

1. Field

The present invention relates generally to billing for telephone calls made from cellular telephones, and more specifically to separable billing for business and personal calls from cellular telephones.

2. Background

Many businesses provide cellular telephones to employees and other affiliates associated with the business. Such telephones may be provided in order to be able to contact the employees in the event of an emergency or other situation needing the immediate attention of the employee, or may be provided to give the employee a means to contact people that the employee needs to contact on a routine basis while away from a traditional land line. For example, a large company may provide cellular telephones to relatively high level employees, such as employees having a certain level or grade within the company and higher. For example, a large company may provide telephones to employees having the title of vice president or higher, or such companies may provide telephones to sales and marketing personnel who may spend significant portions of the day away from the job site while at customer meetings, etc. In many such cases, the business pays for the cellular telephone and pays for all calls made on such a cellular telephone.

When paying for cellular telephones provided to employees, the business generally pays for all calls made on the cellular telephone, both business calls and personal calls. In many cases, companies enter into a contract with a carrier in which the company is sold a bundle of airtime for a preset time period, such as 1,000 minutes for one month. The cumulative use of all of the cellular telephones of the business is then charged against the airtime, and any airtime over the preset limit is billed on a per minute, or other increment, above the preset limit. Often, businesses are aware that the employees having such cellular telephones place both personal calls and business calls using this telephone, and accept this as a reasonable personal use. In the event that an employee is abusing their calling privileges, such an abuse may be detected based upon a review of the bill from the carrier, and in the event of an abase the individual employee may be requested to discontinue such use and/or pay for a portion of their use. Typically, however, if such phones are provided only to relatively high level employees, such abuses are relatively uncommon.

The cellular telephones that a business may provide to various employees are generally relatively inexpensive if purchased along with an airtime plan from a carrier. Due to the relative low costs of such phones, often times businesses would like to provide such cellular telephones to a broader range of employees. However, a significant cost of such airtime plans is the expected or past airtime usage. If a company were confident that it were only paying for airtime related to business related telephone calls, the company may negotiate a contract which has lower airtime per month and thus a significantly lower cost per month. In order to maintain such costs, however, the business must be comfortable that the airtime will exceed the monthly allotment in relatively rare cases. However, when considering whether to provide such cellular telephones to a wider range of employees, the business may decide not to provide the cellular telephones because the business is not confident that the broader range of employees will refrain from significant personal use of the cellular telephones, thus incurring expenses for additional airtime use. There is therefore a need in the art for providing separable billing for cellular telephones in order to keep business airtime at an expected level while also, providing cellular telephones to a broader range of employees with confidence that airtime usage will exceed negotiated airtime allotments only in rare instances.

SUMMARY

Embodiments disclosed herein address the above stated heeds by providing systems, methods, and apparatuses that enable separable billing of business and non-business calls. Business calls may be billed to the business or enterprise, or other entity that provides a telephone to a user, and non-business calls may be billed to the user personally.

In one aspect, the present disclosure provides a remote station apparatus comprising: (a) a transmit/receive subsystem operable to transmit/receive wireless signals to/from a wireless communications network; (b) a user interface; and (c) a calling control subsystem. In this aspect, the calling control subsystem receives an input from the user interface to connect a call over the wireless communications network with a telephone number. The calling control subsystem determines if the number is an approved number and allows the call when the telephone number is an approved number. The calling control subsystem allows the call when the user authorizes personal billing when the telephone number is not an approved number, and the calling control subsystem denies the call when the telephone number is not an approved number and the user has not authorized personal billing. The remote station apparatus may include a memory subsystem and a list of approved numbers may be stored in such a memory subsystem. The calling control subsystem may receive periodic lists of approved numbers and store such lists in the memory subsystem. Furthermore, the calling control subsystem may prompt a user through the user interface to approve personal billing for a call when the number of the call is not an approved number.

In another aspect, the present disclosure provides a base station apparatus comprising: (a) a wireless communications subsystem operable to transmit/receive wireless signals to/from one or more remote stations; and (b) a call control subsystem. The call control subsystem receives a request to place a call to first telephone number and determines if the first telephone number is an approved number. If the first telephone number is an approved number, the call control subsystem places the call, and if the user of the remote station authorizes personal billing for the call, the call control subsystem places the call when the first telephone number is not an approved number. The base station apparatus of this aspect may also comprise a memory subsystem with a list of approved numbers stored in such a memory subsystem.

In still another aspect, the present disclosure provides a sewer apparatus, comprising: (a) a network interface to transmit/receive network communications signals to/from one or more base stations; and (b) a controller to operable to receive information from the network interface regarding calls made to/from at least one remote station through the base station, and provide billing information to a billing system identifying calls to/from the remote station that were not to approved telephone numbers for billing to a user of the remote station personally. The controller may receive information regarding calls to/from approved and non-approved telephone numbers from the remote station or from the base station. The controller may also receive information regarding a requested and determine if the number of the requested call is an approved number, and approve placement of the call when the telephone number is an approved number, and approve placement of the call if the user has authorized personal billing when the number is not an approved number.

In still a further aspect, the present disclosure provides a method for placing a call from a wireless communications device, comprising: (a) receiving a request to place a first call to a first telephone number; (b) determining if said first number is an approved number; (c) placing the call when the first number is an approved number; (d) determining if a user has authorized personal billing when the first number is not an approved number; and (e) placing the call when the user authorizes personal billing of the first number when the first number is not an approved number. Placement of the call may be denied when the number is not an approved number and the user has not authorized personal billing for the call.

In yet another aspect, the present disclosure provides a computer-readable medium including program code stored thereon, comprising (a) program code for receiving a request to place a first call to a first telephone number; (b) program code for determining if the first telephone number is an approved number; (c) program code for placing the first call when the first telephone number is an approved number; (d) program code for determining if a user has authorized personal billing for the first call when the first number is not an approved number; and (e) program code for placing the first call when the user authorizes personal billing of the first call and the first number is not an approved number.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
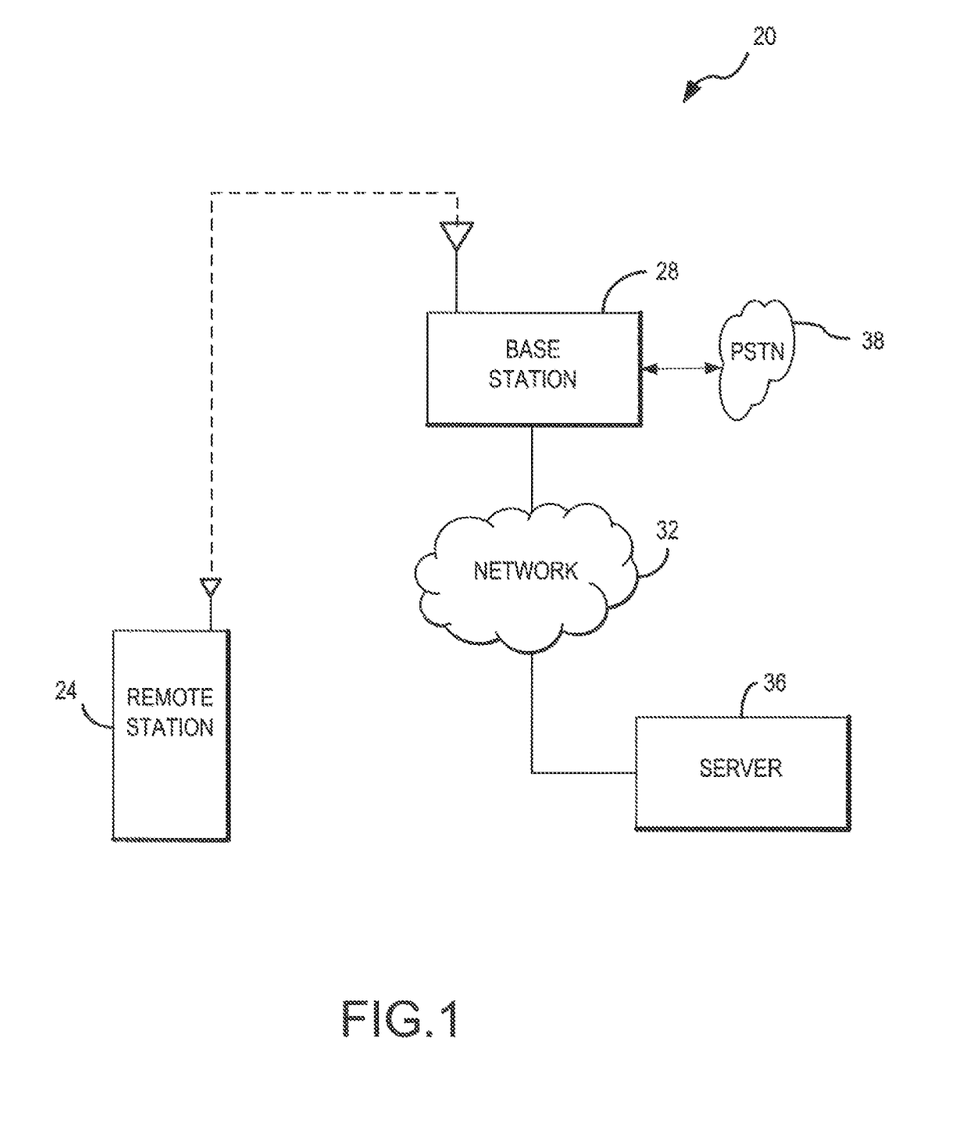
FIG. 1 is block diagram representation of a communications network of an exemplary embodiment.

FIG. 1 illustrates a wireless communications network 20 of an exemplary embodiment. In this embodiment, the wireless communications network 20 includes a remote station 24, a base station 28 that is interconnected to a network 32 which may be a single network or a combination of different networks, such as, for example, the public switched telephone network (PSTN) and/or the internet. Also included in this embodiment is a server 36 that is also interconnected to the network 32. The remote station 24, in this embodiment, is a wireless communication device such as a mobile telephone that communicates with base station 28 using one or more of many available wireless protocols such as code division multiple access (CDMA), global system for mobile communication (GSM), wireless local area network (WLAN) that operate using specifications conforming to, for example, IEEE802.11B, and commonly referred to as "wifi," or the like. While the remote station 24 as discussed in many of the exemplary embodiments described herein is described as a mobile telephone, it will be understood that other devices that provide voice or other audio communications may also serve as a remote station, such as a personal computer or PDA equipped to provide voice and/or audio communications. Furthermore, while a single remote station 24 is illustrated in FIG. 1, it will be understood that a typical wireless communications network 20 will include numerous remote stations 24 and that a single remote station 24 is illustrated for purposes of a simplified illustration and discussion. The remote station 24 may provide a user with many different functions, one of which is audio communications between a user and one or more entities, such as other persons and/or devices coupled to the network 32 that provide audio information to the user, such as a voicemail system. In one embodiment, the remote station 24 is provided by a business to a user that is associated with the business. Such a business may provide a remote station 24 in order to have enhanced communications between the business and the user. As used herein with reference to a remote station 24, a user is the primary user of the remote station 24, and the user's identity is associated with a unique identification of the remote station 24. In embodiments described herein, the remote station 24 provides audio communications to business related entities and personal entities, and, prior to providing communications to personal entities, verities that the user has authorized such communications and provides a log of personal communications for air time billing purposes. In the event that the user has not authorized communications to personal entities, the remote station 24 denies the communication. In this manner, a user of the remote station 24 may access personal entities and business entities, as will be described in more detail below. Furthermore, while reference is made to a business entity that provides a remote station 24, and pays expenses related to calls to approved business entities, it will be understood that the principles described herein apply to any entity that provides a user with a remote station. For example, a parent may provides a cellular phone to a child (such as a college age child) and pays for calls to family members but does not desire to pay for calls made by the child to other numbers.

The remote station 24 of the embodiment of FIG. 1 communicates with a base station 28. Such communications may include any available communications protocol, such as CDMA, although any other analog and/or digital communications protocol may also be used. The base station 28 is interconnected with the network 32, and communicates with one or more devices also interconnected with the network 32. While a single base station 28 is illustrated, it will be understood that wireless communications networks 20 typically include numerous base stations 28 throughout the coverage area of the wireless communications network 20. Wireless communications networks 20 may also include other elements, such as mobile switching center (MSC), that will sot be described in any additional detail as such elements are generally known in the art. Server 36, in this embodiment, is interconnected with the network 32 and may provide services and/or information to the remote station 24 related to authorizing voice calls as will be described in more detail below. While this embodiment illustrates the server 36, and base station 28 as separate items on the network 32, it will be understood that the functions of one or more of these items may be incorporated, or co-located, with the other item.

Figure 2:
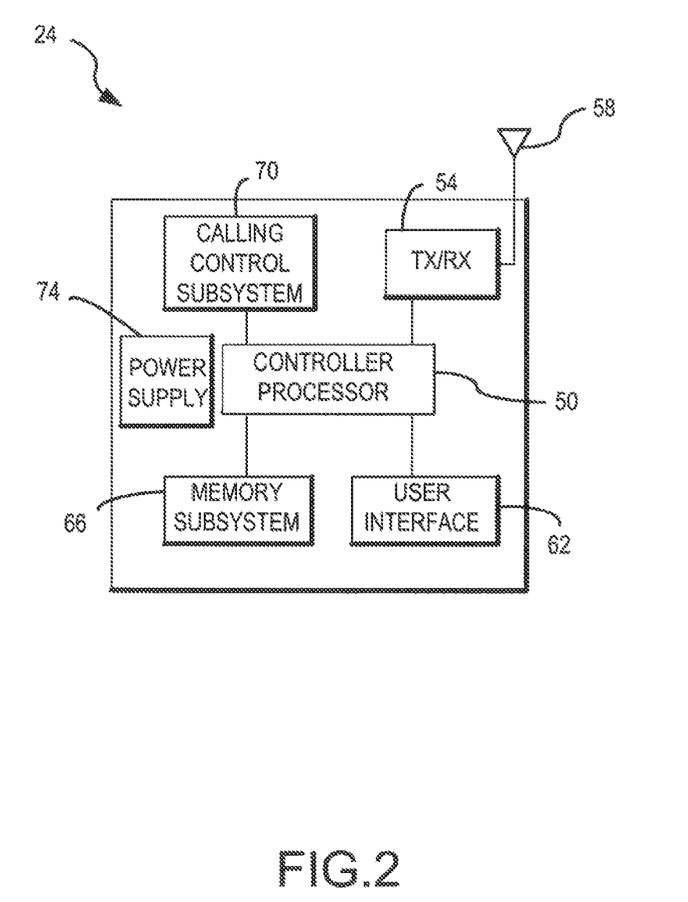
FIG. 2 is a block diagram representation of a remote station of an exemplary embodiment.

With reference now to FIG. 2, a remote station 24 of an exemplary embodiment is described in more detail. The remote station 24 includes several components, including a control processor 50. The control processor 50 controls functions of the remote station 24, and provides computing functionality to process any inputs and/or data as may be required for the operation of the remote station 24. Connected to the control processor 50 is transmit/receive circuitry 54 that transmits/receives wireless signals to/from an antenna 58. The transmit/receive circuitry 54 performs functions typical of such components as used in wireless communications, such as modulating signals received from the control processor 50 that are to be transmitted over the antenna 58, and demodulating received from the antenna 58 and providing the demodulated signals to the control processor 50. The antenna 58 may be any antenna suitable for a wireless communications device in the wireless communications network 20, and while illustrated as a single antenna, may include one or more different send and/or receive antennas. A user interface 62 is interconnected with the control processor 50, and provides an audio, visual and/or physical interface to a user. Such user interfaces 62 commonly include, a speaker, microphone, visual display screen, and one or more physical input devices such as a keypad, track wheel, and/or special input buttons that control speaker volume, etc. The control processor 50, in this embodiment, is also interconnected with a memory subsystem 66 that may be used to store processing instructions to be executed by the control processor 50. The memory subsystem 66 may also store data necessary and/or convenient to the operation of the remote station 24, such as data relating to one or more base stations, network timing information, a directory of user contacts, and a listing of personal contacts that the user has authorized for personal billing, to name but a few. Such personal contacts and a directory of user contacts will be described in more detail below. The memory subsystem 66 may include volatile and/or non-volatile memory on any suitable storage media. Also interconnected to the control processor 50 is a calling control subsystem 70. The calling control subsystem 70 operates to verify that any numbers called by the remote station 24 are authorized numbers that may be called using the remote station 24, and that the caller identification of incoming calls are authorized numbers. In one embodiment, the calling control subsystem accesses a listing of authorized numbers stored in the memory subsystem 66, and when a user of the remote station places/receives a call to/from such numbers, the calling control subsystem allows the call. In the event that a user attempts to place/receive a call to/from a number which is not included in the list of authorized numbers, the calling control subsystem may deny the call. Such authorized numbers, and the calling control subsystem, are discussed in more detail below for several exemplary embodiments. The remote station 24 also includes a power supply 74 that may include one or more rechargeable batteries and an interface to an external power source. The power supply 74 provides any necessary power for the operation of the various components of the remote station 24. Furthermore, while not illustrated in FIG. 2, many remote stations include additional components such as, for example, cable interfaces that allow the remote station to be interconnected with other computing devices, short range wireless transmitters/receivers such as Bluetooth technology devices, GPS receivers, for determining position information of the remote station, and/or CCD arrays for digital imaging.

Figure 3:
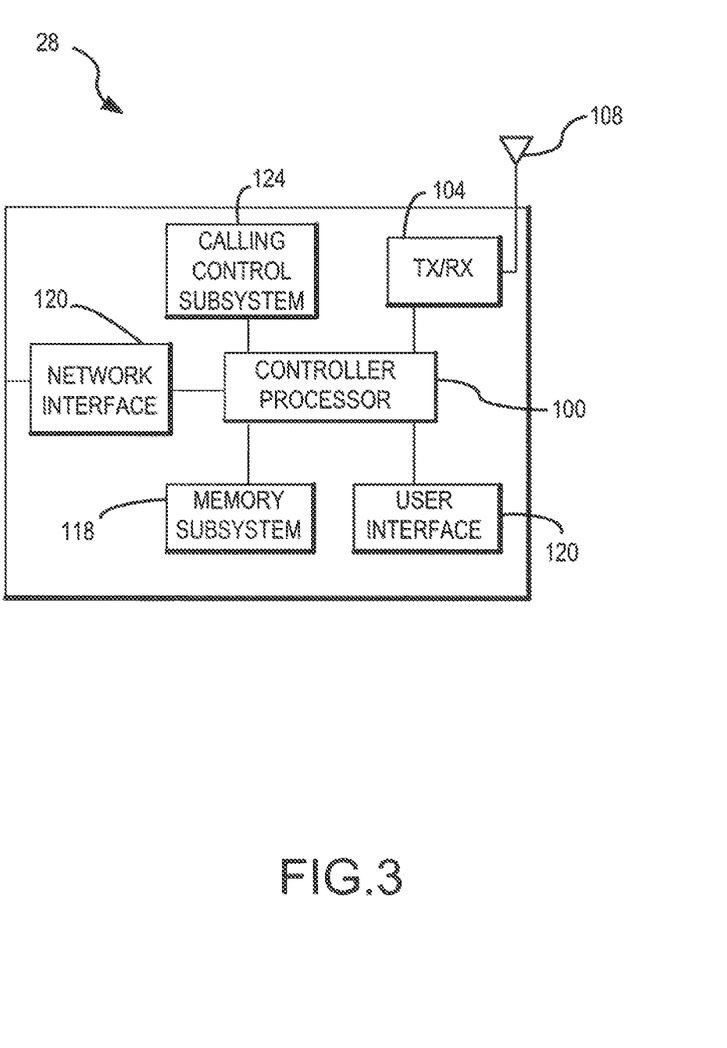
FIG. 3 is a block diagram representation of a base station of an exemplary embodiment.

FIG. 3 is a block diagram of a base station of an exemplary embodiment. In this embodiment, the base station 28 includes a control processor 100 that is interconnected to a transmit/receive subsystem 104 and antenna subsystem 108. The transmit/receive subsystem 104 provides capability to transmit/receive wireless communications to/from various different remote stations and/or other base stations. Furthermore, the transmit/receive subsystem 104 may provide communications with one or more satellites. The antenna subsystem 108 may include one or more transmit and receive antennas, and may include different antennas for communications with different, devices, with different communication protocols, and/or for communications in different specified directions relative to the base station 28. A network interface 112 is interconnected with the control processor 100, and provides an interface to network 32 (FIG. 1). A memory subsystem 116 is interconnected to the control processor, and includes processing instructions to be executed by the control processor 100. The memory subsystem 116 also may store data necessary and/or convenient for the operation of the base station 28, such as data relating to one or more base stations, data relating to one or more remote stations within range of the base station 28, network timing information, and a directory of adjacent base stations, to name bat a few. Such a memory subsystem 116 may include volatile and/or non-volatile memory on any simple storage media. The base station 28 also includes a user interface 120, that may be used by network personnel to interface with systems of the base station 28.

Figure 4:
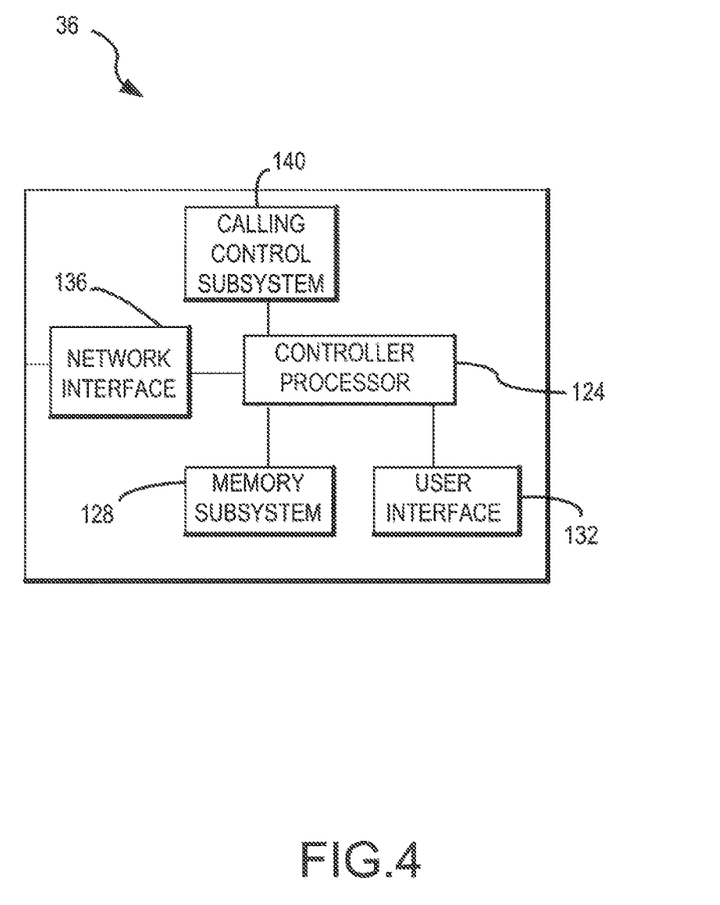
FIG. 4 is a block diagram representation of a server of an exemplary embodiment.

Referring now to FIG. 4, a block diagram illustration of a server 36 of an exemplary embodiment is now described. In this embodiment the server 36 includes a control processor 124 that is interconnected to a memory subsystem 128, a user interface 132, and a network interface 136. The control processor 124 is also connected to a call control subsystem 140. The memory subsystem 128 is used to store processing instructions to be executed by the control processor 124. The memory subsystem 128 also may store data necessary or convenient for the operation of the server, such as data relating to authorized numbers that may be called by various different remote stations that are associated with the server, along with billing information for such authorized numbers. In one embodiment, the server 36 is also associated with a database containing information related to users, remote station identifications that are associated with respective users, and authorized numbers for each of the users. The authorized numbers may include business and personal numbers with a field indicating which of such numbers are to be billed to the user and billed to the business. Such memory subsystem 116 may include volatile and/or non-volatile memory on any suitable storage media. The user interface 132 provides an interface for appropriate personnel to interface with the server 36. The network interface 136 provides an interface between the server and the network 32 (FIG. 1). The call control subsystem 140, in one embodiment, is used to log particular calls for remote stations associated with the server, and also provides billing information related to calls for a remote station for business purposes and calls with personal numbers and which are to be billed personally to the user of the remote station rather than to the business.

Figure 5:
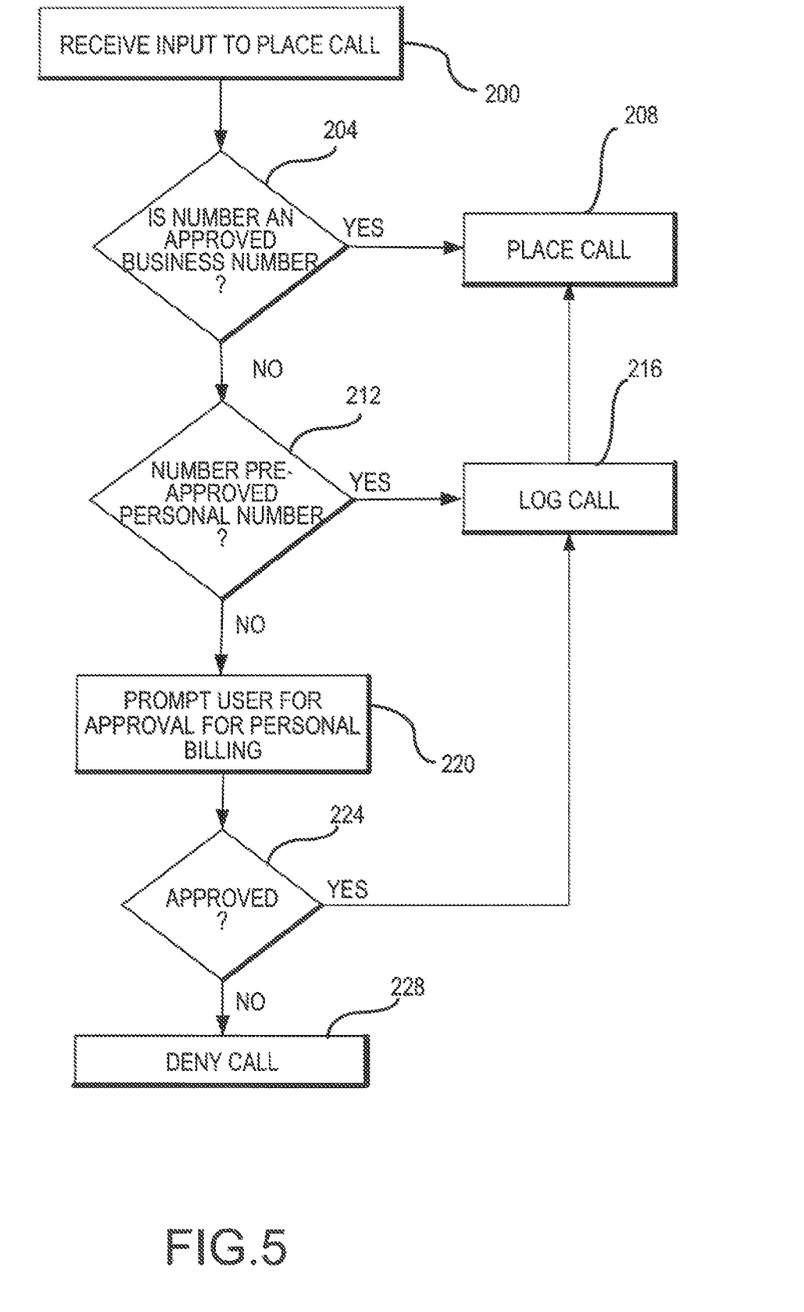
FIG. 5 is a flow chart illustrating the operational steps of a remote station of an exemplary embodiment.

Referring now to FIG. 5, the operational steps of a remote station of an exemplary embodiment are now described. In this embodiment, initially, at block 200, the remote station receives an input to place or receive a call. Placement of a call may be indicated by the user entering a known number using a keypad of the remote station and depressing a send button, or selecting a particular number from a library of telephone numbers included in the memory of the remote station. The input to receive a call may be received by the user depressing a talk button, or otherwise providing an indication to the remote station that the user desires to speak with a person upon receiving a prompt of an incoming phone call to the remote station. At block 204, it is determined if the number is an approved business number. In one embodiment, the memory of the remote station includes a library, or listing, of telephone numbers which are approved for business purposes. The remote station, upon receiving the input to place a call, compares the number of the desired call with the library of approved business numbers. In the event that the remote station receives a telephone call, the caller identification of the incoming call is compared against the list of approved business numbers. In some embodiments, the server will periodically transmit updates or new lists of approved business numbers to a remote station. If it is determined at block 204 that the number is an approved business number, the call is allowed as indicated at block 208. If the number is not an approved business number at block 204, it is then determined at block 212 if the number is pre-approved for personal billing. Similarly as described above with business numbers, in some embodiments the remote station includes a library or list of telephone numbers that have been pre-authorized for personal billing by a user. For example, a user may enter various personal telephone numbers into a library, or directory, of numbers to be stored within the memory of the remote station, and also provide an indication that all calls to/from these numbers are approved for personal billing. If it is determined that the number is a pre-approved personal number, the call is logged as noted at block 216 and the call is allowed, according to block 208. If the number is not a pre-approved personal number at block 212, the remote station prompts the user for approval for personal billing as noted at block 220. At block 224, it is determined whether the user approves the personal billing. If such personal billing is approved, the operations of block 216 are performed. If the personal billing is not approved by the user at block 224, the remote station denies the call as indicated at block 228. Periodically, the remote station of such an embodiment would transmit the call log to the server for purposes of generating and transmitting a bill to the user for the personal calls. Alternatively, in other embodiments, the remote station may set a flag when allowing the call, the flag indicating to the server that the call is a personal call and the server then logging such a call for billing purposes. In such a manner, the business, or other party, feat provides the remote station to the user may accomplish cost containment effectively and efficiently. In situations where the business, or other party, that provides the remote station provides all air time on a set contract, the percentage of personal calls may be apportioned and billed to the user.

Figure 6:
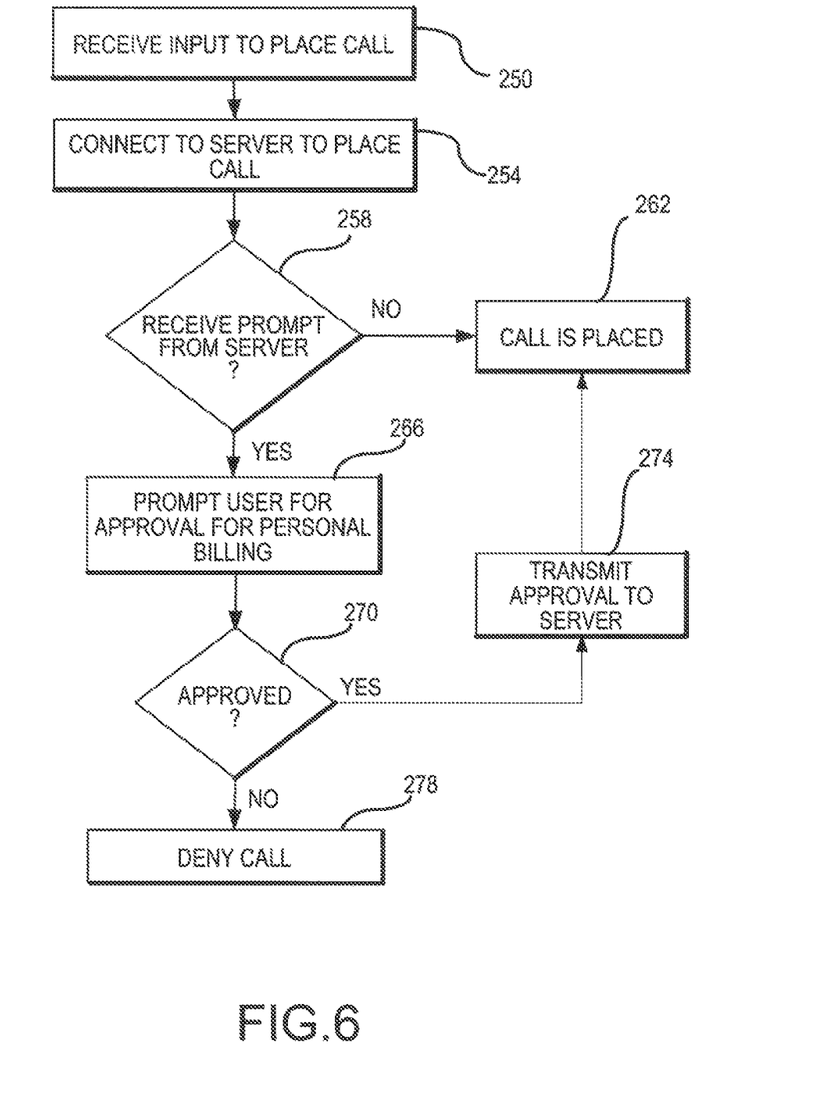
FIG. 6 is a flow chart illustration of the operational steps of a remote station of another exemplary embodiment.

Referring now to FIG. 6, the operational steps of another exemplary embodiment are now described for a remote station. Initially, in this embodiment, the remote station receives an input to place or receive a call, as noted at block 250. At block 254, the remote station connects to a server prior to initiating a call connection, as noted at block 254. When connecting to the server, the remote station provides information indicating the number of the call, such that the server may compare the number to a list of approved business numbers, or a list of pre-approved list of personal numbers associated with the user of the particular remote station. In the event that the server determines that the number is not an approved business number, or a pre-approved personal number, the server sends an indication to the remote station that the user is to be prompted, for personal billing, as indicated at block 258. If such a prompt is not received from the server, the call is placed as noted at block 262. If the remote station does receive such a prompt from the server, the user is prompted for approval for personal billing of the particular phone call, as noted at block 266. At block 270, the remote station determines if the user has approved personal billing. If the user has approved personal billing, the remote station transmits such approval to the server, as noted at block 274, and the call is placed at block 262. If the user does not approve personal billing at block 270, the call is denied as indicated at block 278.

Figure 7:
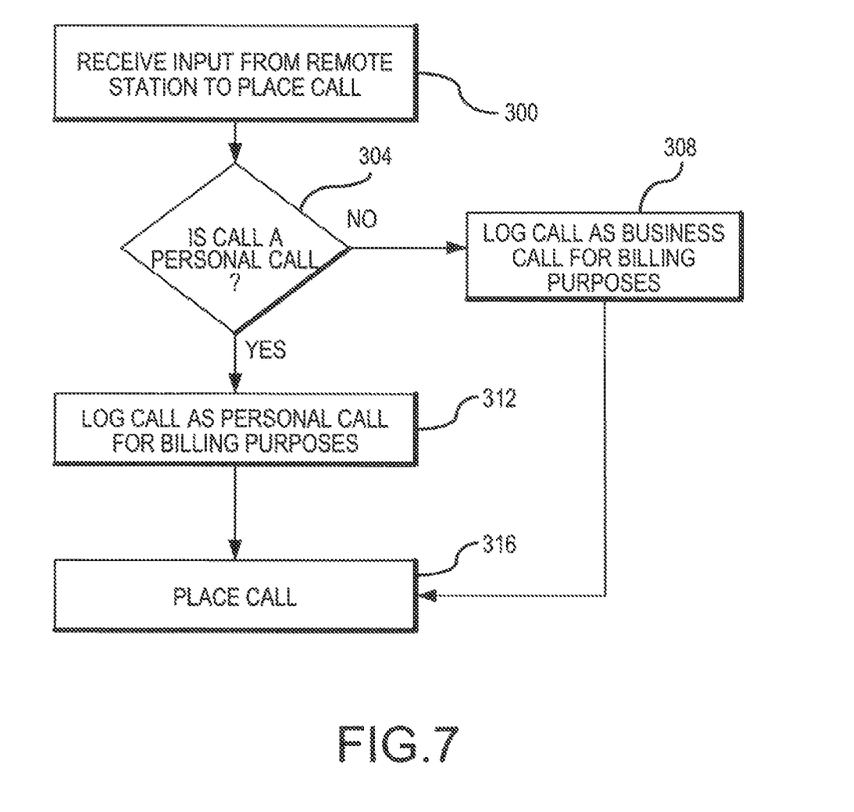
FIG. 7 is a flow chart illustration of the operational steps of a base station or server of an exemplary embodiment.

With reference now to FIG. 7, the operational steps of a server of an embodiment are now described. In this embodiment, the server receives an input from a remote station to place or receive a call as noted at block 300. At block 304, the server determines if the call is a personal call. Similarly as described above, the server may include a directory of numbers that are approved for business purposes, and may also include a directory of numbers that are particular users of particular remote stations have defined as pre-approved for personal billing to the user of the remote station. The server may also receive an indication from the remote station of whether a call is a personal call or a business call. If the call is not a personal call, the server logs the call as a business call for billing purposes, as noted at block 308. If the call is a personal call, the server logs the call as a personal call for billing purposes, as indicated at block 312. At block 316, the call is allowed.

Figure 8:
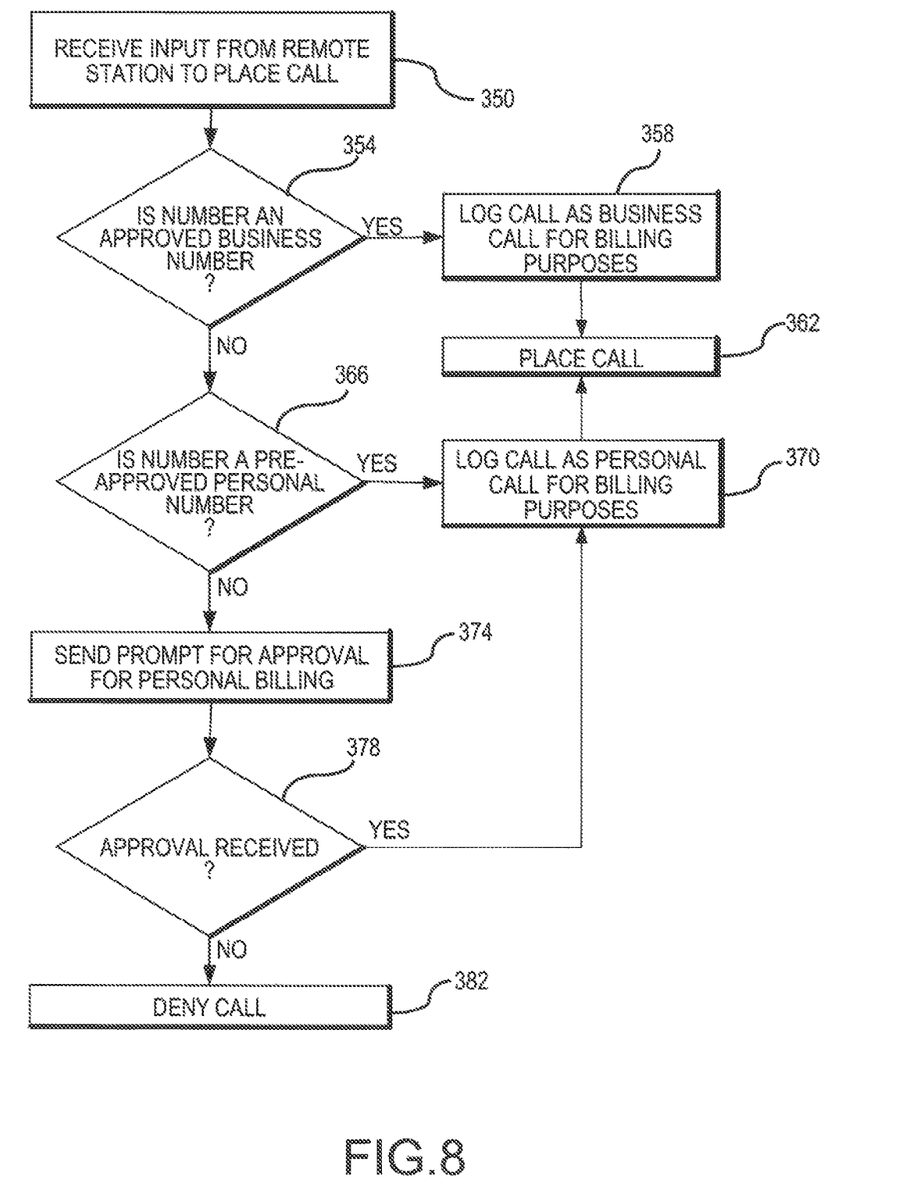
FIG. 8 is a flow chart illustration of the operational steps of a base station or server of another exemplary embodiment.

Referring now to FIG. 8, the operational steps of a server of another exemplary embodiment are now described. In this embodiment, the server at block 350, receives input from a remote station to place or receive a call. The input from the remote station may include the number to which a call is to be placed, or the identification of a received incoming call. At block 354, the server determines if the number is an approved business number. If the number is an approved business number, the server logs the call as a business call for billing purposes, as noted at block 358, and the call is allowed according to block 362. In the event that the number is not an approved business number at block 354, it is determined at block 366 if the number is a pre-approved personal number. If the number is a pre-approved personal number, the server logs the call as a personal call for billing purposes, as noted at block 370, and the call is allowed according to block 362. In the event that it is determined that the number is not a pre-approved personal number, the server sends a prompt to the remote station to gain approval from the user for personal billing, as indicated at block 374. At block 378, it is determined if such an approval is received. If approval is received, the operations of block 370 are performed, and if the approval is not received, the call is denied, as indicated at block 382.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm, steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. If implemented in a software module, the functions may be stored on or transmitted over as one or more instructions or code on a computer-readable medium. Computer-readable media includes both computer storage media and communication media including any medium that facilitates transfer of a computer program from, one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage, devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data, magnetically, while discs reproduce data optically with lasers. Combinations of the above should also be included within the scope of computer-readable media. The processor and the storage medium may reside is an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scopes of the invention. Thus, the present invention is not intended to be limited to the embodiments shown herein but is to be accorded the widest scope consistent with the principles and novel features disclosed herein.

What is claimed is:
1. A remote station apparatus, comprising:
   a transmit/receive subsystem configured to transmit/receive wireless signals to/from a wireless communications network;
   a calling control subsystem configured to:
      receive a request from a user to place a first call over the wireless communications network to a first telephone number;
      receive periodic updates to a list of approved telephone numbers;
      determine if said first telephone number is an approved telephone number based on the list of approved telephone numbers;
      prompt the user for authorization for personal billing when the first telephone number is not an approved telephone number, wherein the prompting occurs after receiving the request from the user to place the first call and before allowing or denying placement of the first call;
      set a flag when allowing the placement of the first call, the flag indicating to a server that the first call is a personal call and prompting the server to log the first call for billing purposes; and
      deny placement of the first call when the first telephone number is not an approved number and the user has not authorized personal billing for the first call.

2. The remote station apparatus of claim 1, further comprising:
   a memory subsystem, and wherein the list of approved telephone numbers is stored in the memory subsystem.

3. The remote station apparatus of claim 2, wherein said calling control subsystem is further configured to:
   receive the list of approved telephone numbers from a server; and
   store said list of approved telephone numbers in said memory subsystem.

4. The remote station apparatus of claim 1, wherein said calling control subsystem is further configured to:
   log personal call information in a call log; and
   provide the call log to a billing system.

5. A method for managing a call from a wireless communications device, comprising:
   receiving a request from a user to place a first call to a first telephone number;
   receiving periodic updates to a list of approved telephone numbers;
   determining if said first telephone number is an approved telephone number based on the list of approved telephone numbers;
   prompting the user for authorization for personal billing when the first telephone number is not an approved telephone number, wherein the prompting occurs after receiving the request from the user to place the first call and before allowing or denying placement of the first call;
   setting a flag when allowing the placement of the first call, the flag indicating to a server that the first call is a personal call and prompting the server to log the first call for billing purposes; and
   denying placement of the first call when the first telephone number is not an approved telephone number and the user has not authorized personal billing for the first call.

6. A non-transitory computer-readable medium including program code stored thereon, comprising:
   program code for receiving a request to place a first call to a first telephone number;
   program code for receiving periodic updates to a list of approved telephone numbers;

program code for determining if said first telephone number is an approved telephone number based on the list of approved telephone numbers;

program code for prompting the user for authorization for personal billing when the first telephone number is not an approved telephone number, wherein the prompting occurs after receiving the request from the user to place the first call and before allowing or denying placement of the first call;

program code for setting a flag when allowing the placement of the first call, the flag indicating to a server that the first call is a personal call and prompting the server to log the first call for billing purposes; and program code for denying placement of the first call when the first telephone number is not an approved telephone number and the user has not authorized personal billing for the first call.

7. A remote station apparatus, comprising:

means for receiving a request from a user to place a first call to a first telephone number;

means for receiving periodic updates to a list of approved telephone numbers;

means for determining if said first telephone number is an approved telephone number based on the list of approved telephone numbers;

means for prompting the user for authorization for personal billing when the number is not an approved number, wherein the prompting occurs after receiving the request from the user to place the first call and before allowing or denying placement of the first call;

means for setting a flag when allowing the placement of the first call, the flag indicating to a server that the first call is a personal call and prompting the server to log the first call for billing purposes; and means for denying placement of the first call when the first telephone number is not an approved telephone number and the user has not authorized personal billing for the first call.

8. The remote station apparatus of claim 3, wherein the calling control subsystem is further configured to allow placement of the first call when the first telephone number is not an approved telephone number and the user has authorized personal billing for the first call.

9. The method of claim 5, further comprising:

storing the list of approved telephone numbers in a memory subsystem.

10. The method of claim 9, further comprising:

receiving the list of approved telephone numbers from a server; and storing the list of approved telephone numbers in the memory subsystem.

11. The method of claim 5, further comprising:

logging personal call information in a call log; and providing the call log to a billing system.

12. The method of claim 10, further comprising allowing placement of the first call when the first telephone number is not an approved telephone number and the user has authorized personal billing for the first call.

13. The non-transitory computer-readable medium of claim 6, further comprising:

program code for storing the list of approved telephone numbers in a memory subsystem.

14. The non-transitory computer-readable medium of claim 13, further comprising:

program code for receiving the list of approved telephone numbers from a server; and program code for storing the list of approved telephone numbers in the memory subsystem.

15. The non-transitory computer-readable medium of claim 6, further comprising:

program code for logging personal call information in a call log; and program code for providing the call log to a billing system.

16. The non-transitory computer-readable medium of claim 14, further comprising program code for allowing placement of the first call when the first telephone number is not an approved telephone number and the user has authorized personal billing for the first call.

17. The remote station apparatus of claim 7, further comprising:

means for storing the list of approved telephone numbers.

18. The remote station apparatus of claim 17, further comprising:

means for receiving the list of approved telephone numbers from a server; and means for storing the list of approved telephone numbers.

19. The remote station apparatus of claim 7, further comprising:

means for logging personal call information in a call log; and means for providing the call log to a billing system.

20. The remote station apparatus of claim 18, further comprising means for allowing placement of the first call when the first telephone number is not an approved telephone number and the user has authorized personal billing for the first call.

* * * * *